US008315557B1

(12) United States Patent
Rao et al.

(10) Patent No.: US 8,315,557 B1
(45) Date of Patent: Nov. 20, 2012

(54) COMMON APERTURE ANTENNA FOR MULTIPLE CONTOURED BEAMS AND MULTIPLE SPOT BEAMS

(75) Inventors: Sudhakar Rao, Churchville, PA (US); Jim Wang, Churchville, PA (US); Chih-Chien Hsu, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 193 days.

(21) Appl. No.: 12/823,841

(22) Filed: Jun. 25, 2010

Related U.S. Application Data

(60) Provisional application No. 61/291,589, filed on Dec. 31, 2009.

(51) Int. Cl.
*H04B 7/185* (2006.01)

(52) U.S. Cl. ...... 455/13.3; 455/427; 455/431; 455/12.1; 343/765; 343/761; 343/772; 343/775

(58) Field of Classification Search .................. 455/427, 455/431, 12.1, 13.3; 343/765, 761, 772, 343/775, 779, 776, 786
See application file for complete search history.

(56) References Cited

U.S. PATENT DOCUMENTS

| | | | | |
|---|---|---|---|---|
| 5,258,767 | A * | 11/1993 | Nomoto et al. | 343/781 R |
| 6,366,257 | B1 * | 4/2002 | Ramanujam et al. | 343/781 P |
| 6,456,251 | B1 * | 9/2002 | Rao | 343/757 |
| 6,456,252 | B1 * | 9/2002 | Goyette | 343/779 |
| 6,940,452 | B2 | 9/2005 | Munoz et al. | |
| 7,024,158 | B2 | 4/2006 | Wiswell | |
| 7,382,743 | B1 | 6/2008 | Rao et al. | |
| 2005/0052333 | A1 * | 3/2005 | Rao et al. | 343/840 |
| 2009/0309801 | A1 | 12/2009 | Rao et al. | |

OTHER PUBLICATIONS

Written Opinion dated Feb. 17, 2011 for PCT/US2010/060988.
International Search Report dated Feb. 17, 2011 for PCT/US2010/060988.

* cited by examiner

*Primary Examiner* — Fayyaz Alam
(74) *Attorney, Agent, or Firm* — McDermott Will & Emery LLP

(57) ABSTRACT

An antenna assembly includes a reflector having a focal plane, a first feed element located along the focal plane that illuminates the reflector to create a first contour beam at a first frequency and a second feed element located further from the reflector than the first feed element that illuminates the reflector to create a first spot beam at a second frequency, the second frequency being different than the first frequency.

7 Claims, 11 Drawing Sheets

COMMON APERTURE ANTENNA FOR MULTIPLE CONTOURED BEAMS AND MULTIPLE SPOT BEAMS

CROSS-REFERENCES TO RELATED APPLICATIONS

This patent application claims priority to U.S. Provisional Patent Application Ser. No. 61/291,589, filed Dec. 31, 2009, entitled "Antenna System Providing Multiple De-Focused Contour Beams At A Lower Frequency Band And Multiple Focused Spot Beams At A Higher Frequency Band Using Contour Aperture" and which is incorporated herein by reference in its entirety.

BACKGROUND OF THE INVENTION

This application relates to antennas and, in particular, antennas supporting both contour and spot beams with a common aperture.

A communications satellite (sometimes abbreviated to COMSAT) is an artificial satellite stationed in space for the purpose of telecommunications. Many advances have been made in satellite communications. With these advances come additional requirements.

For instance, complex COMSATS may require hybrid payloads at C-band, Ku-band $ Ka-band. Antenna farm for these payloads require the use of 6 large reflectors (4 along east-west of S/C and two on the deck). Each antenna adds both weight and expense to a satellite.

Accordingly, it is desirable to reduce the number of antennas on a satellite while still meeting communication requirements.

SUMMARY OF THE INVENTION

These and other advantages and features will become more apparent from the following description taken in conjunction with the drawings.

According to one aspect of the invention, an antenna assembly is provided. The assembly includes a reflector having a focal plane and a first feed element located along the focal plane at a first distance from the reflector that illuminates the reflector to create a first contour beam at a first frequency. The assembly also includes a second feed element located at a second distance from the reflector that illuminates the reflector to create a first spot beam at a second frequency different than the first frequency, the second distance greater than the first distance.

According to another aspect of the present invention a method of operating an antenna is provided. The method includes providing a reflector configured to support two or more contour beams created by two or more feed elements, both feed elements being located in a focal plane of the reflector; providing a spot beam feed array; illuminating the reflector with the spot beam feed element at a plurality of distances; measuring the phase angle at an aperture of the reflector of multiple signals created by the spot beam at each distance; determining a spot beam feed element location selected from the one or more distances that creates a signal having a phase angle that varies within a limit across the aperture; and locating the spot beam feed element at the spot beam feed element location.

According to another aspect of the present invention, a satellite is provided. The satellite includes a first reflector having a focal plane and a communications deck. The satellite also includes a first feed element coupled to the communications deck located at a first distance from the reflector and located in the focal plane that illuminates the first reflector to create a first contour beam at a first frequency. The satellite also includes a second feed element coupled to the communications deck located at a second distance from the reflector that illuminates the first reflector to create a first spot beam at a second frequency different than the first frequency, the second distance being greater than the first distance.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting the same, a common aperture antenna that combines several functions and coverage beams into one and the method of making the same are disclosed. Consequently, the antenna suit for a satellite may be simplified. For example, multiple Ku-band contour feeds and one or more Ka- band spot feeds may be combined on a single antenna. This allows for fewer reflectors to be used and, thus, may help avoid expensive deck antennas and their tower support structure.

In one embodiment of the invention, one or more feeds are added to a reflector to generate one or more contoured beams by shaping the reflector surface for one or more coverage beams. The surface shape can be synthesized to produce one or more contoured beams that are spatially isolated from each other from the same reflector.

By using an existing Ku-band shaped beam reflector in accordance with an exemplary embodiment of the invention (without compromising the Ku-band performance), and proper defocusing of the Ka-band feeds to generate a near uniform phase across an aperture of the antenna as disclosed herein, Ka-band spot beams of acceptable performance can be achieved without using additional dedicated antennas. Combining these multiple feeds leads to reductions in some or all of cost, mass, and integration and test time.

Figure 1:
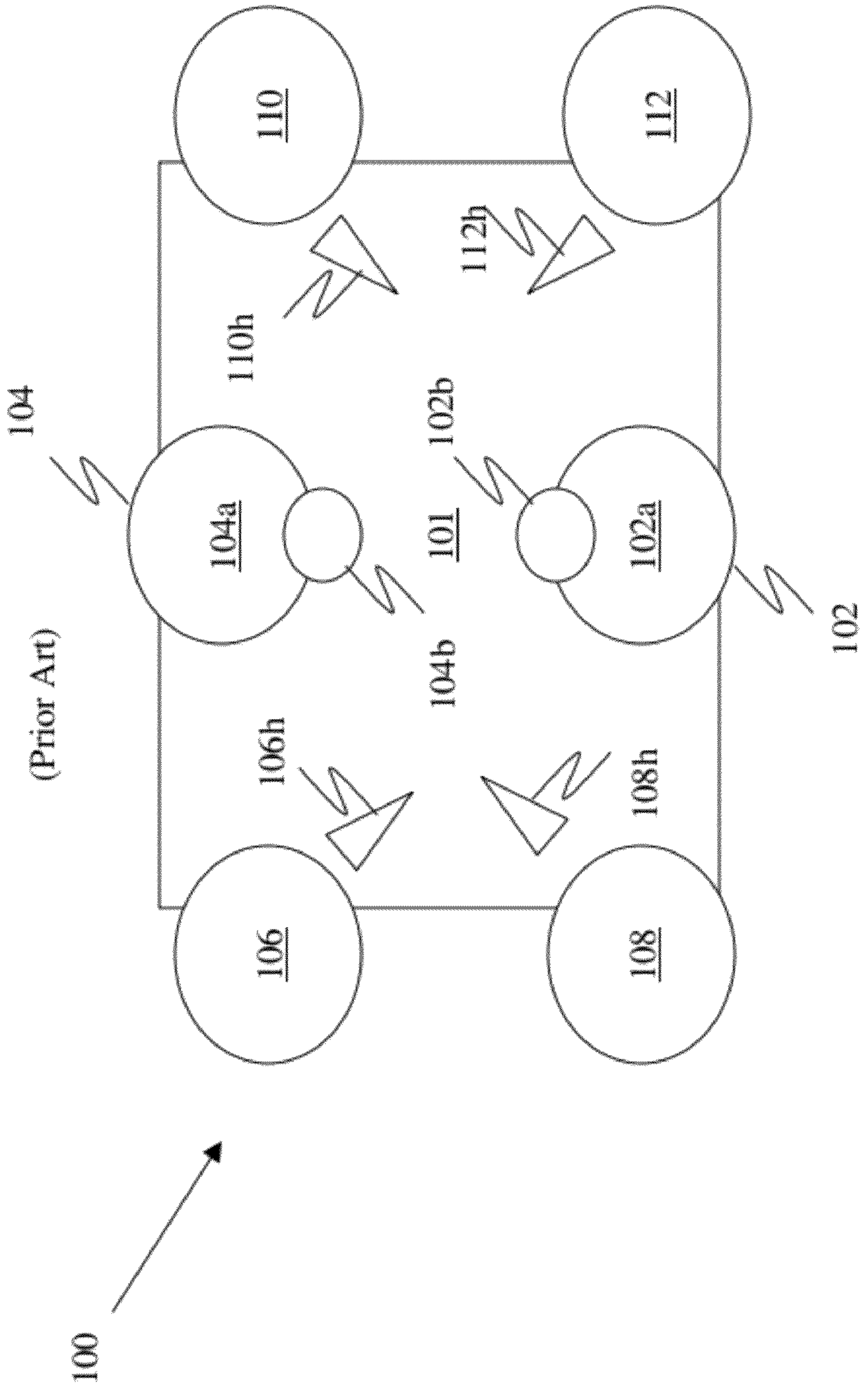
FIG. 1 (Prior Art)
FIG. 1 shows a simplified block diagram of a conventional antenna of the prior art used on a satellite communications spacecraft.

FIG. 1 shows a prior art block-diagram example of a satellite 100 that includes a spacecraft deck 101. In the non-limiting embodiment shown, the spacecraft deck 101 supports feed units (e.g., feed horns) described hereinafter. In addition, one or more antenna reflectors are supported on the spacecraft deck 101. The example spacecraft deck 101 is used herein to illustrate an example of a situation that may be improved by the antenna taught herein and is not meant to limit the present invention.

The spacecraft deck 101 includes one or more dual-reflector antennas supported thereon. For example, deck 101 includes a first antenna 102 and second antenna 104 supported thereon, both of which are dual-reflector antennas. Generally, dual-reflector antennas 102 and 104 includes a main reflector (102*a*, 104*a*) and a sub-reflector (102*b* and 104*b*) with a feed horn disposed between them. In the embodiment shown, it may be assumed that the first antenna 102 covers the Ku-band in Europe and the second antenna 104 covers Ka-band spot locations in South America.

The satellite 100 also includes one or more antenna reflectors 106, 108, 110 and 112 disposed around the deck 101. The reflectors 106, 108, 110 and 112 may be supported by the deck 101, but may be supported by other means. The reflectors 106, 108, 110 and 112 may be any type of reflector including, but not limited to, parabolic reflectors and cassegrain reflectors. Of course, it will be appreciated that deck 101 may include any number of antenna reflectors and the number of reflectors shown is merely illustrative.

Third reflector 106 has a third feed horn 106*h*, fourth reflector 108 has a fourth feed horn 108*h*, fifth reflector 110 has a fifth feed horn 110*h* and sixth reflector 112 has a sixth feed horn 112*h*. A combination of a reflector and a feed horn or other feed mechanism shall be referred to herein as an "antenna farm." Of course, an antenna farm may include other elements such as, for example, additional reflectors, additional feed elements, and support elements holding the reflectors and the feed elements in one or more relationships to one another. In operation, the feed horns may illuminate the reflector to create beams when transmitting or receiving These antenna assemblies shown in FIG. 1 may cover various terrestrial communication regions. For instance, the third antenna assembly (106 and 106*h*) may be cover the Ku-band in North America, the fourth antenna assembly (108 and 108*h*) may cover the Ku-band in Brazil, the fifth antenna assembly (110 and 110*h*) may cover the C-band in North and South America and the sixth antenna assembly (112 and 112*h*) may cover the Ku-ban in South America.

As mentioned above and as can be seen from FIG. 1, the deck 101 includes two antennas, the first antenna 102 and the second antenna 104. It is advantageous to omit these two antennas (or others) with their attendant expense and tower support structures while still maintaining the desired coverage.

Figure 2:
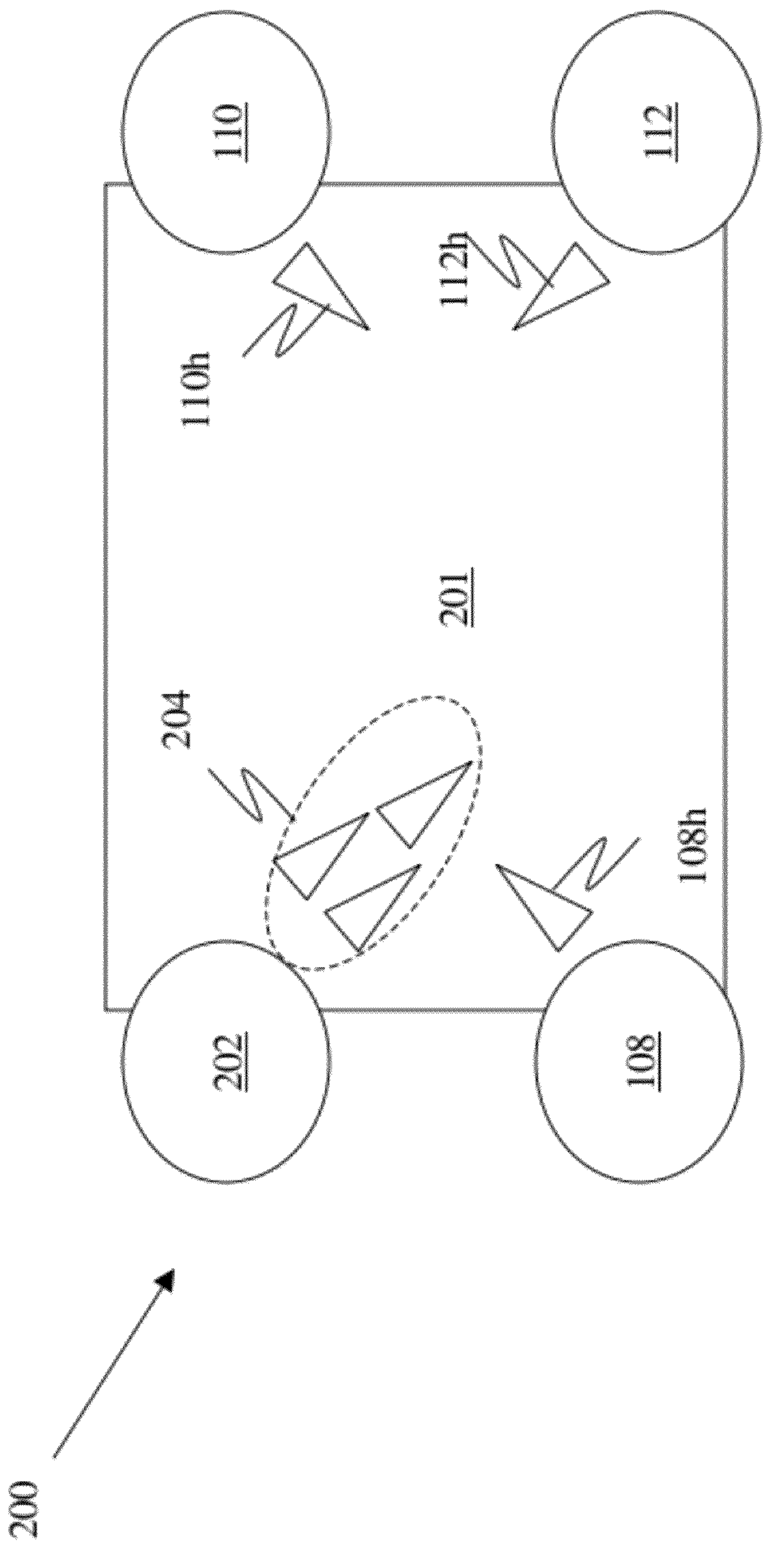
FIG. 2 shows a simplified communications antenna farm of FIG. 1 in accordance with an embodiment of the present invention.

FIG. 2 shows an example of a satellite 200 employing a multiple-beam common aperture antenna 202 according to one embodiment of the present invention. The satellite includes a deck 201 but, unlike the deck 101 of satellite 100 shown in FIG. 1, the deck 201 does not include any deck antennas. Rather, the functions of the two deck antennas 102 and 104 of FIG. 1 have been combined with the third antenna 106 (shown as 202 in FIG. 2) to form the multiple-beam common aperture antenna 202. Of course, FIG. 2 only shows an example of a satellite and does not limit the teachings herein to the particular embodiment shown.

In the embodiment shown, the satellite 200 of FIG. 2 requires only 4 reflectors (instead of 6 in FIG. 1) and avoids expensive deck antennas and their tower support structure. This is accomplished by using a Ku-band shaped beam reflector and defocusing of the Ka-band feeds to generate Ka-band spot beams from a single multiple-beam common aperture antenna 202. The multiple-beam common aperture antenna 202 is fed by two or more feed horns 204. In an illustrative embodiment, at least one of the feed horns 204 supports a spot beam while at least one other feed horn supports a contoured beam. The following description will describe the multiple-beam common aperture antenna 202. In an exemplary embodiment, one feed horn supports a Ku-band contour beam and another feed horn supports a Ka-band spot beam, both of which utilize a single reflector.

Figure 3:
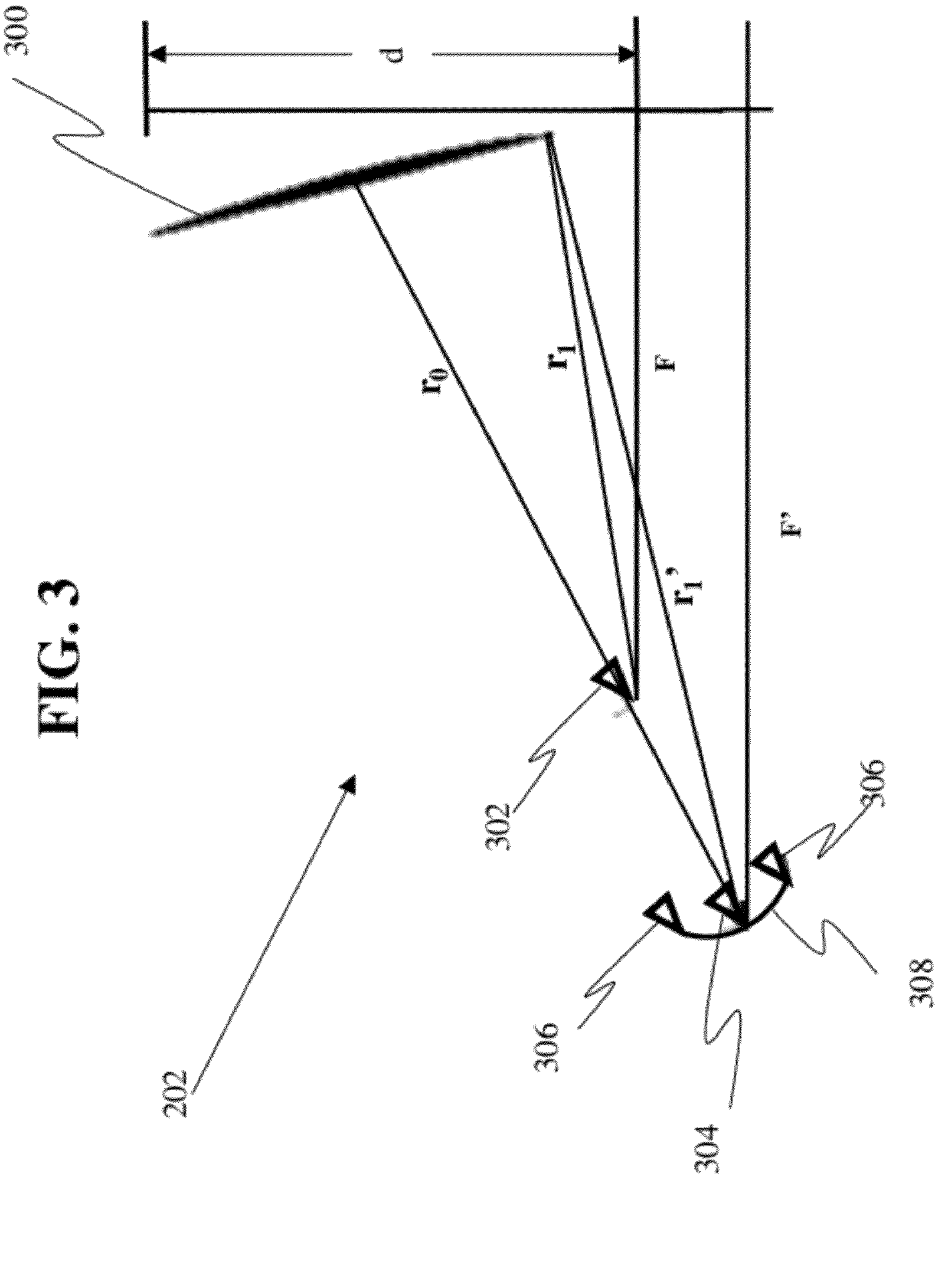
FIG. 3 shows a side-view of a multiple-beam common aperture antenna according to an embodiment of the present invention.

FIG. 3 shows a side-view of a multiple-beam common aperture antenna 202 according to aspect of the invention. The multiple-beam common aperture antenna 202 includes a reflector 300. The multiple-beam common aperture antenna 202 includes a single reflector 300.

The reflector 300 has a diameter d and a center-line 302. In the embodiment shown, the reflector 300 is a parabolic reflector and the diameter d of reflector 300 is 100 inches. Of course, depending on the application, the diameter d may vary.

The multiple-beam common aperture antenna 202 may include a first feed horn 302 disposed along the focal-plane of the reflector and having a focal length F away from a surface of the reflector 300. The first feed horn 302 supports a contoured beam. In the context of a communications satellite, contour beams require the surface of the reflector 300 shaped from a parabolic surface to a non-parabolic surface so as to provide non-linear phase to generate the beam(s) tailored to fit the desired ground coverage(s). It will be understood that the multiple-beam common aperture antenna 202 may include multiple feed horns disposed along the focal plane. Methods of shaping the reflector 300 to support multiple contoured beams (preferably with non-overlapping ground coverage) are known in the art and will not be described in detail herein.

The multiple-beam common aperture antenna 202 also includes a second feed horn 304 disposed a distance F' from the reflector 300. F' is larger than F. That is, the second feed horn 304 is located further away from the reflector 300 than the first feed horn 302. The second feed horn 304 may, in one embodiment provide a spot beam. In additional embodiments (not shown), it will be understood that one or more additional feed horns 306 may be disposed on the same (or generally about the same) plane as the second feed horn 304 to generate multiple spot beams.

The first feed horn 302 provides a signal having a lower frequency than the second feed horn 304. The first feed horn 302 is a Ku-band transceiver and the second feed horn 304 is a Ku-band transceiver. The first feed horn 302 is utilized to transmit or receive a Ku-band contour beam and the second feed horn 304 is utilized to transmit or receive a Ka-band spot beam.

In another embodiment, the multiple-beam common aperture antenna 202 may be an offset antenna. In such an embodiment, the feed horns may be offset from the center-line of the reflector 300 in a manner known in the art.

Prior to Applicants discovery described herein, it was not possible to provide both spot and contoured beams from the same reflector since the contoured beams require de-focused shaped reflectors while the spot beams require focused parabolic reflectors. Indeed, the nature of these two types of beams leads to this situation. It is this realization, however, that underpins the antenna configuration disclosed herein.

For example, the shape of a reflector to create contour beams covering a large geographic area on the earth may cause wide variations in phase across the aperture such that the transmitted/received wave appears non-focused, similar to a spherical wave. In contrast, it has been discovered that when designing a reflector for a spot beam, a phase invariant signal with uniform phase across the aperture is desired. Thus, locating a feed horn at the focus of a reflector designed for contour beams will not produce a spot beam. As disclosed herein, however, examination of phase variations across the aperture of a spot beam located at positions other than the focus reveals feed horn locations from which a spot beam may be created.

Figure 4:
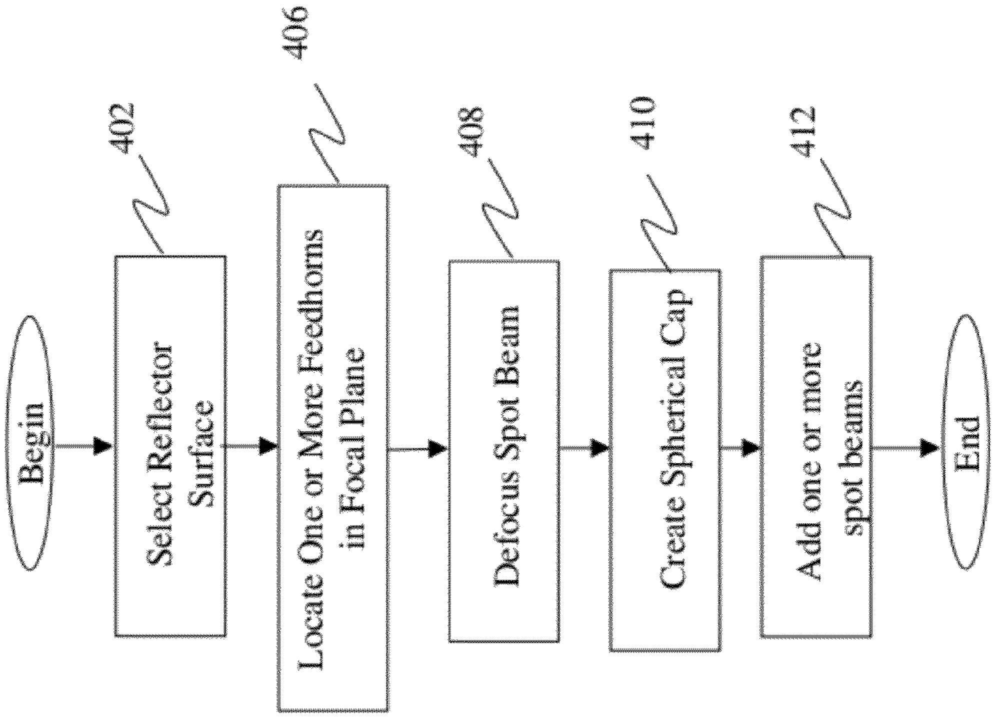
FIG. 4 shows a method of creating a multiple-beam common aperture antenna according to an embodiment of the present invention.

FIG. 4 is a flow chart showing one method of creating a multiple-beam common aperture antenna according to one embodiment of the present invention. The reflector geometry for the common aperture antenna to produce a single or multiple contoured beams is selected, based on the coverage requirements and the spacecraft accommodation.

At a block 402 the reflector surface is synthesized using techniques well-known from the prior-art in order to provide a non-linear phase to generate the beam(s) tailored to fit the coverage on the earth's surface. This phase distribution has two main components: (1) a "large quadratic phase" (LQP) equivalent to several wavelengths to broaden the beam to an elliptic shape that fits the contour; and (b) a "small non-linear phase" (SNP) within a wavelength that fine-tweaks the contour shape.

At a block 406 one or more feed horns are located in the focal plane. In one embodiment these feed horns support Ku-band signals.

At a block 408 the feed location for a spot beam is defocused relative to the focal-plane unit such that the new de-focused location un-folds the large quadratic phase distribution into an almost uniform phase distribution.

At a block 410, after the feed location is established for the spot beam, a feed horn for the spot beam is located at the feed location. Optionally, a spherical cap 308 shown in FIG. 3 may be created to locate the spot beam feed to minimize scan losses. At an optional block 412, one or more additional feeds for spot beams may be located at the spherical cap. Using this method, spot beams can be generated, in addition to contoured beams, using a common aperture antenna system without compromising the contoured beam performance. In an exemplary embodiment, the spot beam feeds are Ka-band feeds.

Figure 5:
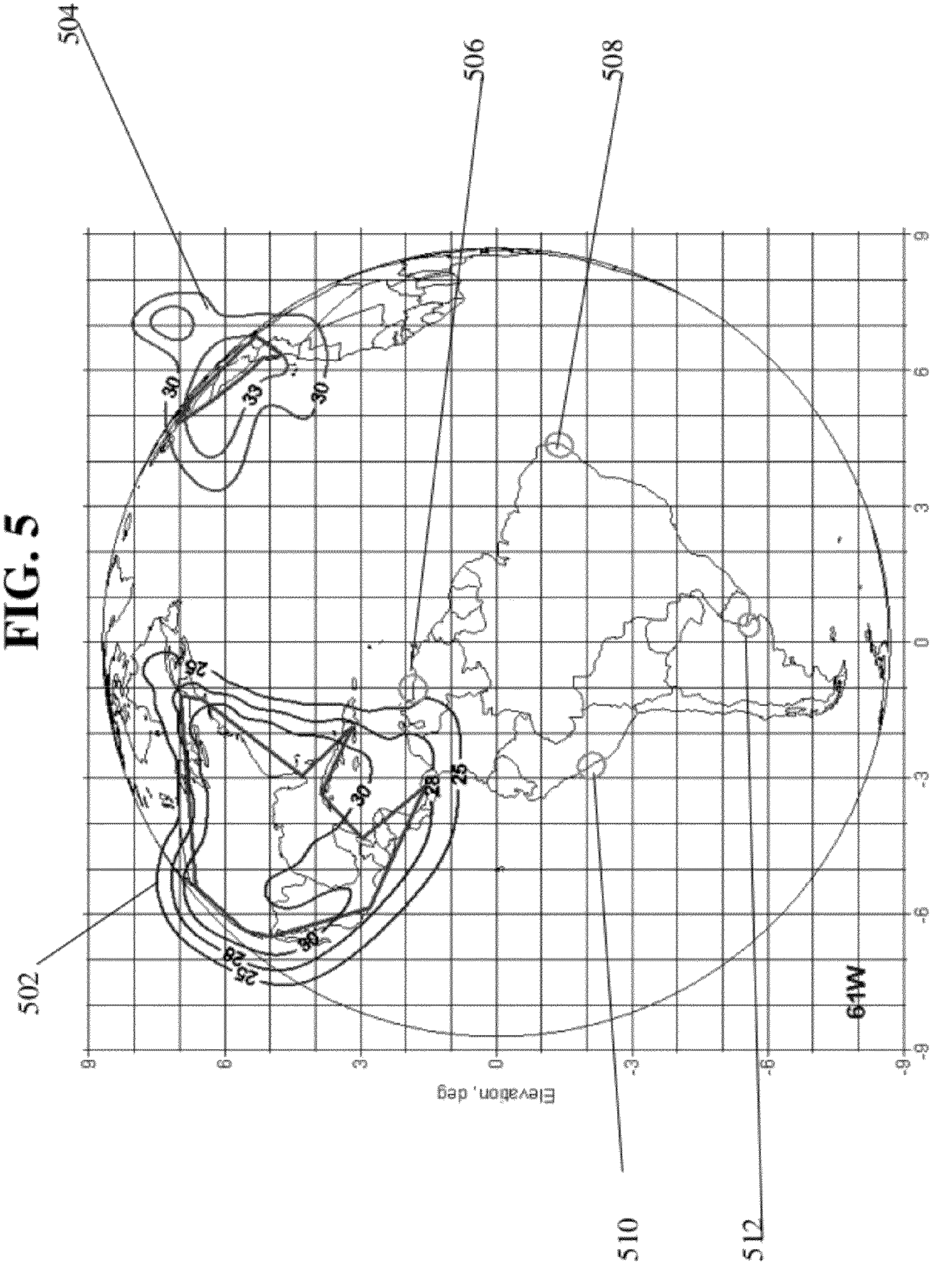
FIG. 5 shows a map of the earth with coverage areas that would benefit from one aspect of the invention having two contoured beams and four spot beams.

FIG. 5 shows a map of the earth with coverage areas that may require two contoured beams and four spot beams for context. In particular, one reflector may be used to provide Ku-band coverage for a North America region 502 and a Europe region 504. The same reflector may be used to provide spot coverage for individual cities located, for example, in South America. The individual cities are shown by reference numerals 506, 508, 510 and 512.

Figure 6:
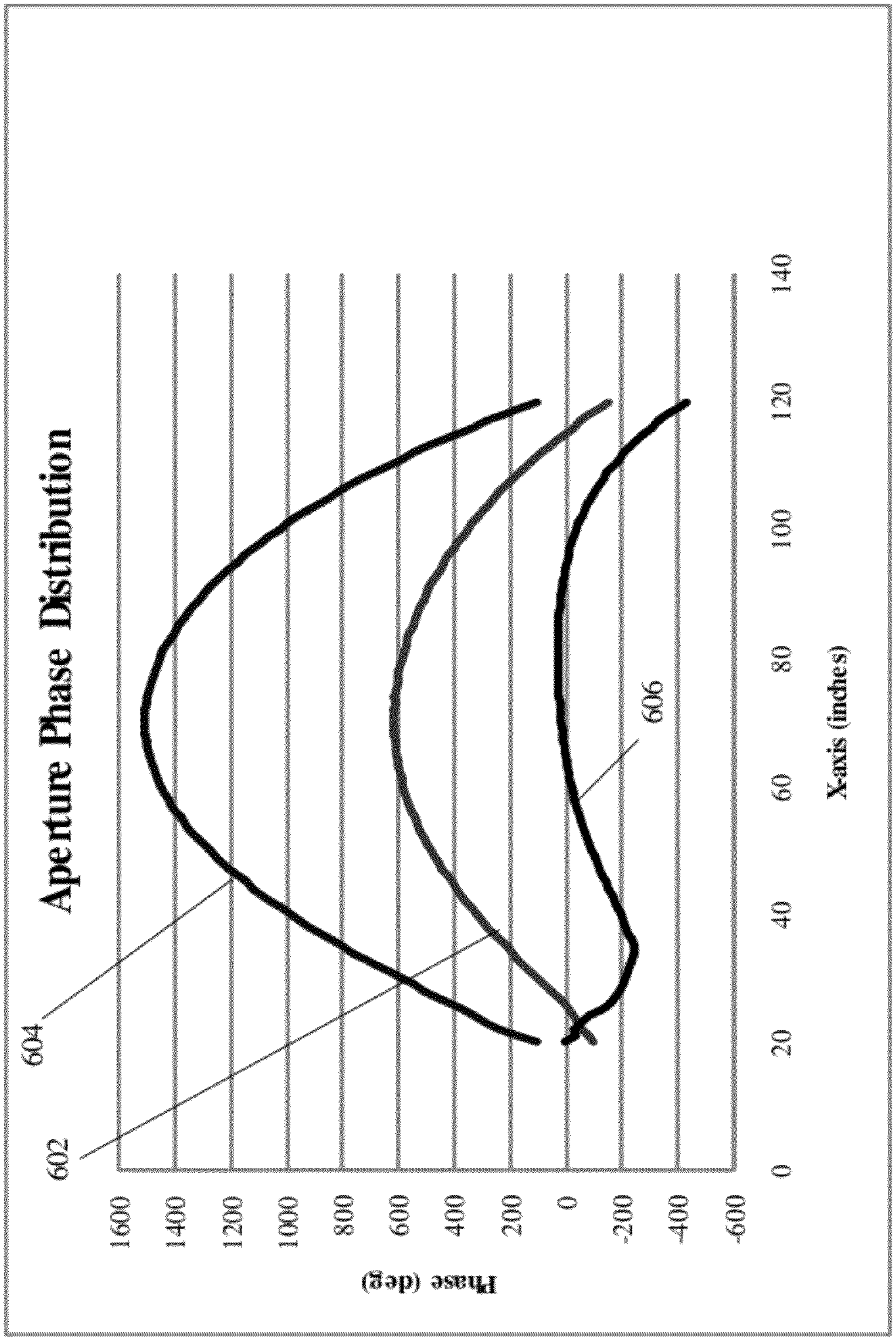
FIG. 6 shows an example graph of various phase variations across an aperture relative to feed location in accordance with another aspect of the invention.

FIG. 6 shows an example graph of various phase variations across an aperture relative to feed location. In more detail, the y-axis shows phase angle and the x-axis spans a 100-inch diameter reflector that is offset by 20 inches. Measurement of phase angle along the aperture of a signal produced by a Ku-band feed horn located in or near the focal plane of the reflector yields the first profile 602. The first profile 602 shows variations of roughly 600 degrees in phase angle across the aperture. This is acceptable for a contour beam. Measurement of phase angle along the aperture of a signal produced by a Ka-band feed horn located in or near the focal plane yields the second profile. The second profile 604 shows variations of over 1400 degrees. If the Ka-band feed horn is configured to create a spot beam, this wide variation in phase angle is unacceptable.

As discussed above, moving the location of Ka-band feed horn further away from the reflector may reduce the variation on phase angle across an aperture. The third profile 606 represents variations in phase angle across an aperture of a signal produced by a Ku-band feed horn displaced 60 inches beyond the focal plane. This example shows that the variation of phase angle is greatly reduced as the Ku-band feed horn is defocused. Of course, at some point the variation of phase angle may begin to increase as the feed horn is further removed from the focal plane. Accordingly, by measuring phase variation across an aperture, a distance with minimal phase variation can be discovered. This distance is then be used to locate feed horns for spot beams of a particular frequency. In this manner, spot beams may be created utilizing a reflector designed for contour beams.

Figure 7:
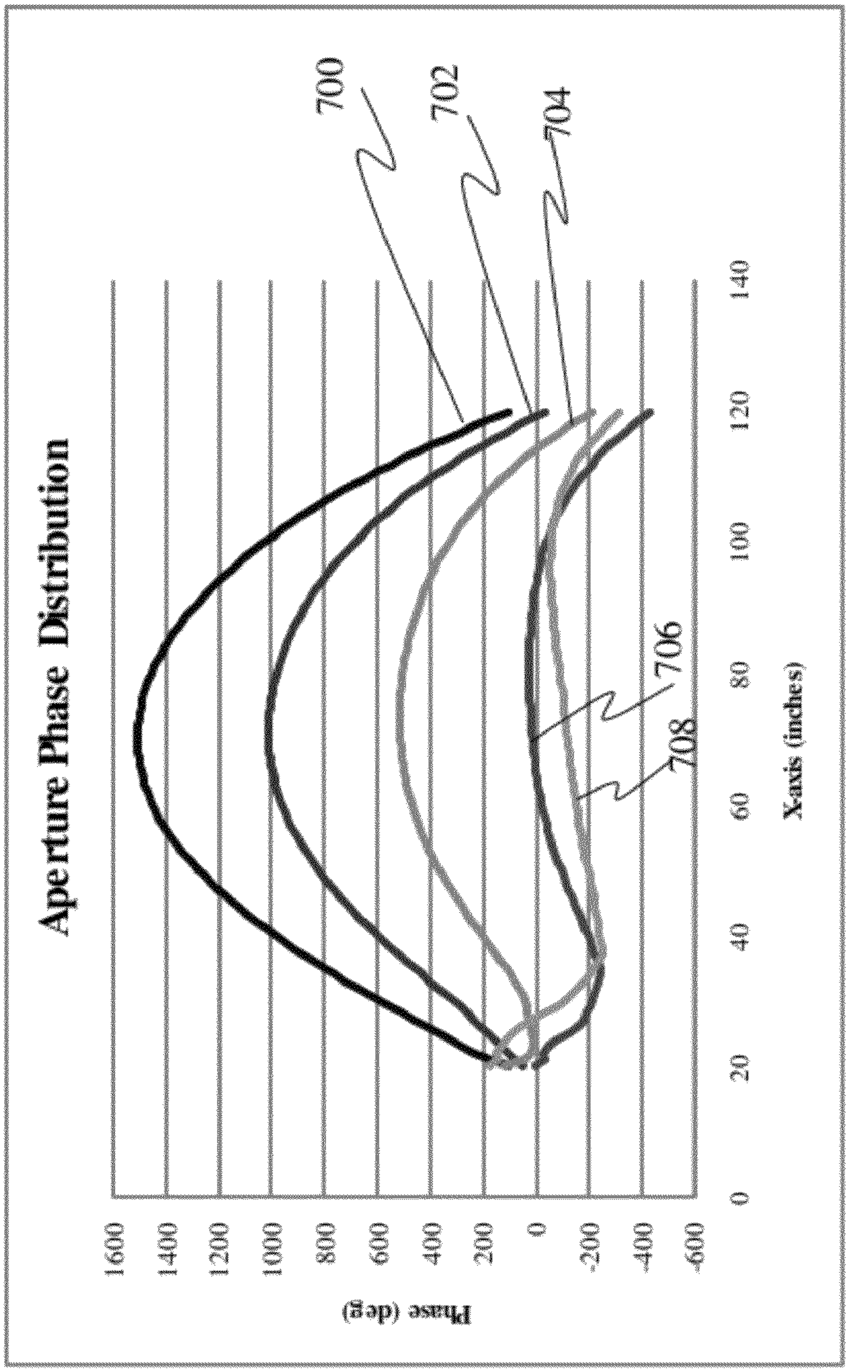
FIG. 7 shows variations in Ka-band phase distribution across the aperture for different feed horn distances displaced from the focal plane.

FIG. 7 shows variations in Ka-band phase distribution across the aperture for different feed horn distances displaced from the focal plane. In more detail, the y-axis shows phase angle and the x-axis spans a 100-inch diameter reflector that is offset by 20 inches. The first profile 700 is measured with the feed horn in or near the focal plane; the second profile 702 is measured with the feed horn 20 inches further from the reflector than the focal plane; the third profile 704 is measured with the feed horn 40 inches further from the reflector than the focal plane; the fourth profile 706 is measured with the feed horn 60 inches further from the reflector than the focal plane; and the fourth profile 708 is measured with the feed horn 80 inches further from the reflector than the focal plane. From these profiles, it may be seen that the further profile 706 has the least phase variation and, therefore, the distance of the fourth profile should be utilized to locate the Ka-band feed horns. Of course, the values described in FIG. 7 are by way of example and other values could be used.

Figure 8:
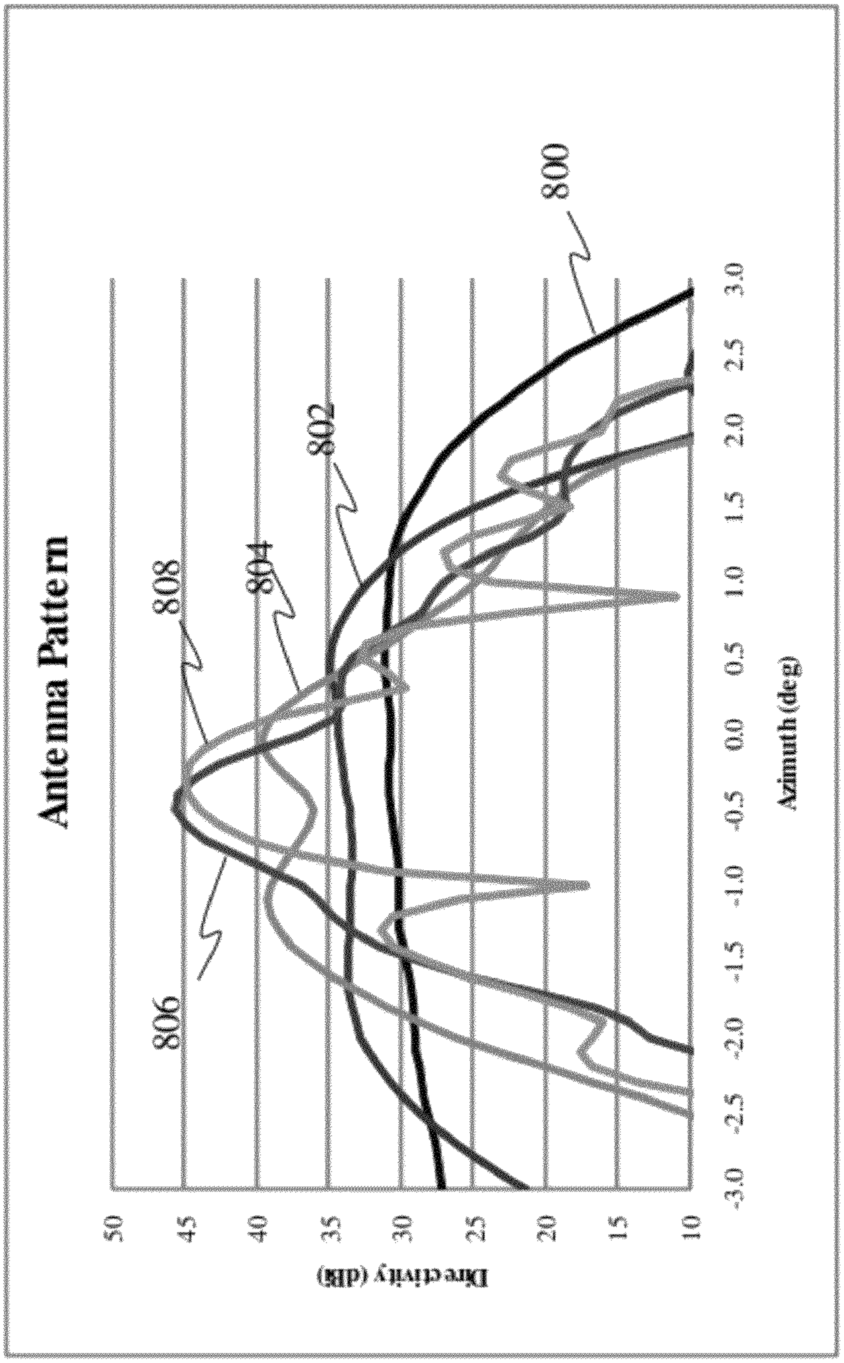
FIG. 8 shows variations in directivity with respect to azimuth for several different Ka-band feed horn locations in accordance with still yet another aspect of the invention.

FIG. 8 shows example variations in directivity (measured in dB) with respect to azimuth (measured in degrees) for several different Ka-band feed horn locations. The first profile 800 is measured with the feed horn in or near the focal plane; the second profile 802 is measured with the feed horn 20 inches further from the reflector than the focal plane; the third profile 804 is measured with the feed horn 40 inches further from the reflector than the focal plane; the fourth profile 806 is measured with the feed horn 60 inches further from the reflector than the focal plane; and the fourth profile 808 is measured with the feed horn 80 inches further from the reflector than the focal plane.

Figure 9:
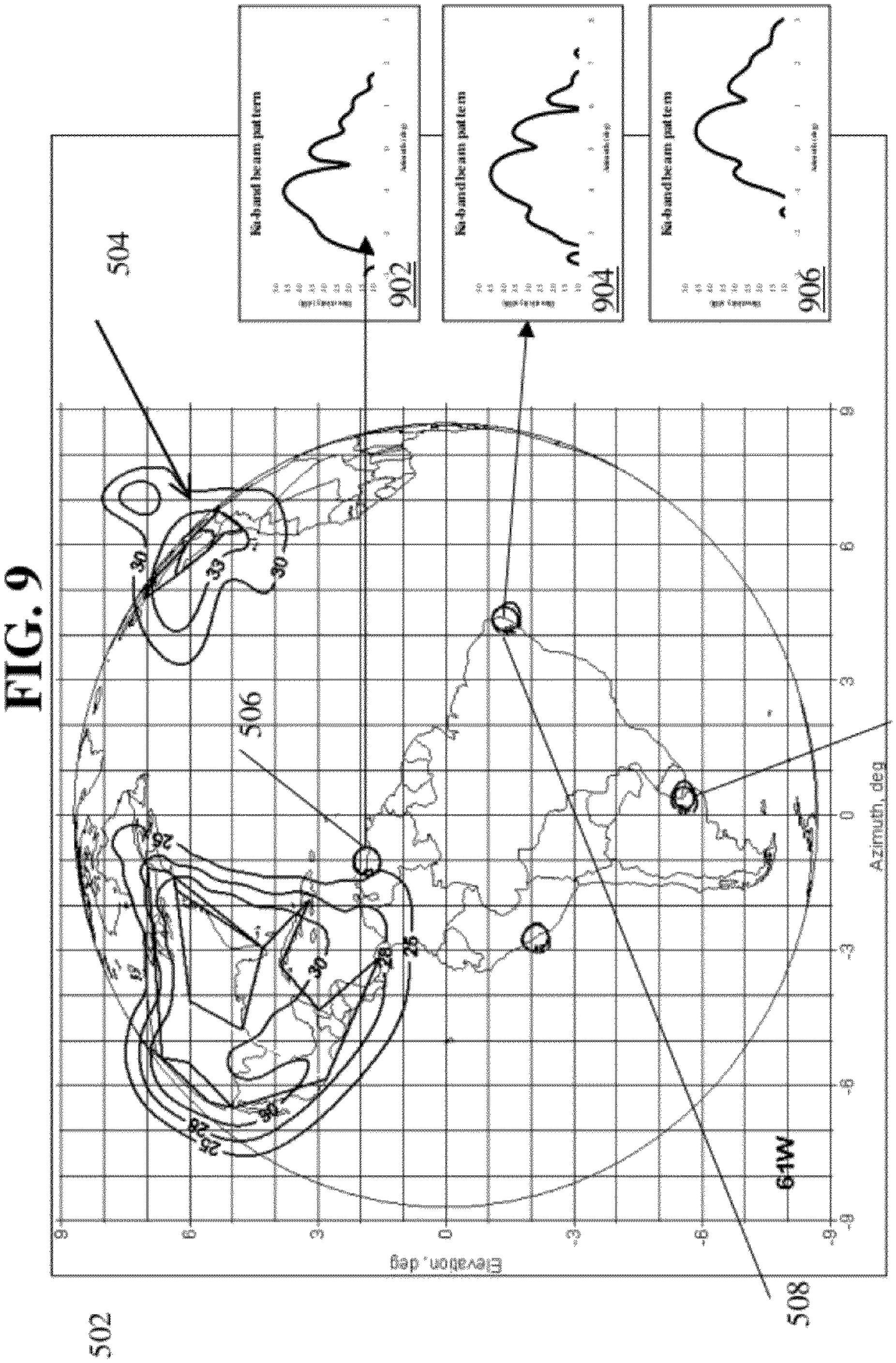
FIG. 9 shows the map shown in FIG. 4 with the beam patterns for three of the spot beams.

FIG. 9 shows the map of in FIG. 4 with the beam patterns 902, 904 and 906, for three of the spot beams, 506, 508, 510, respectively.

Figure 10:
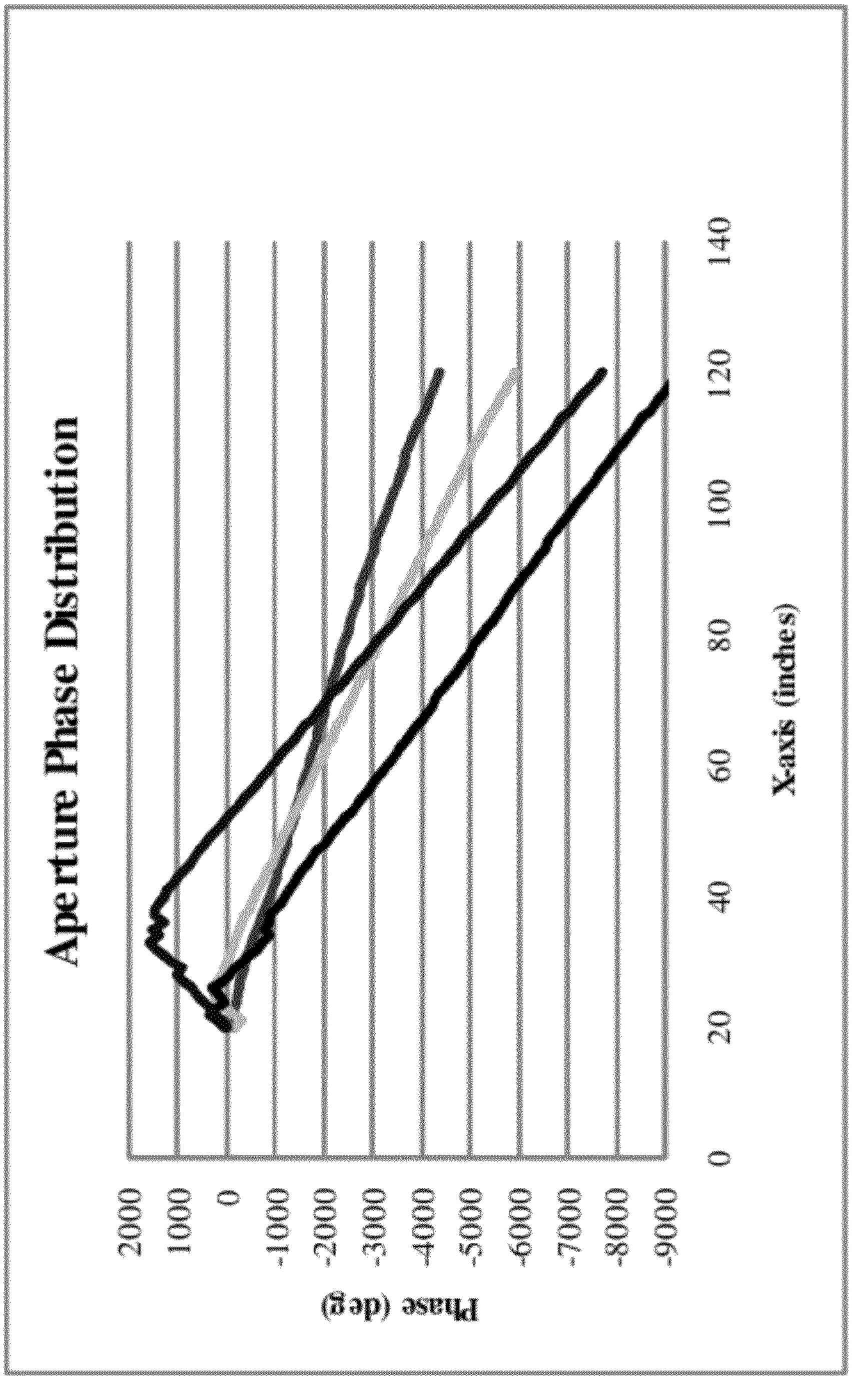
FIG. 10 shows computed aperture plane phase distributions for four Ka-band spot beams at different scan locations along a spherical cap in accordance with an aspect of the invention.

FIG. 10 shows computed aperture plane phase distributions for the four Ka-band spot beams at different scan locations along the spherical cap 308 (FIG. 3). The phase distribution is almost linear across the aperture.

Figure 11:
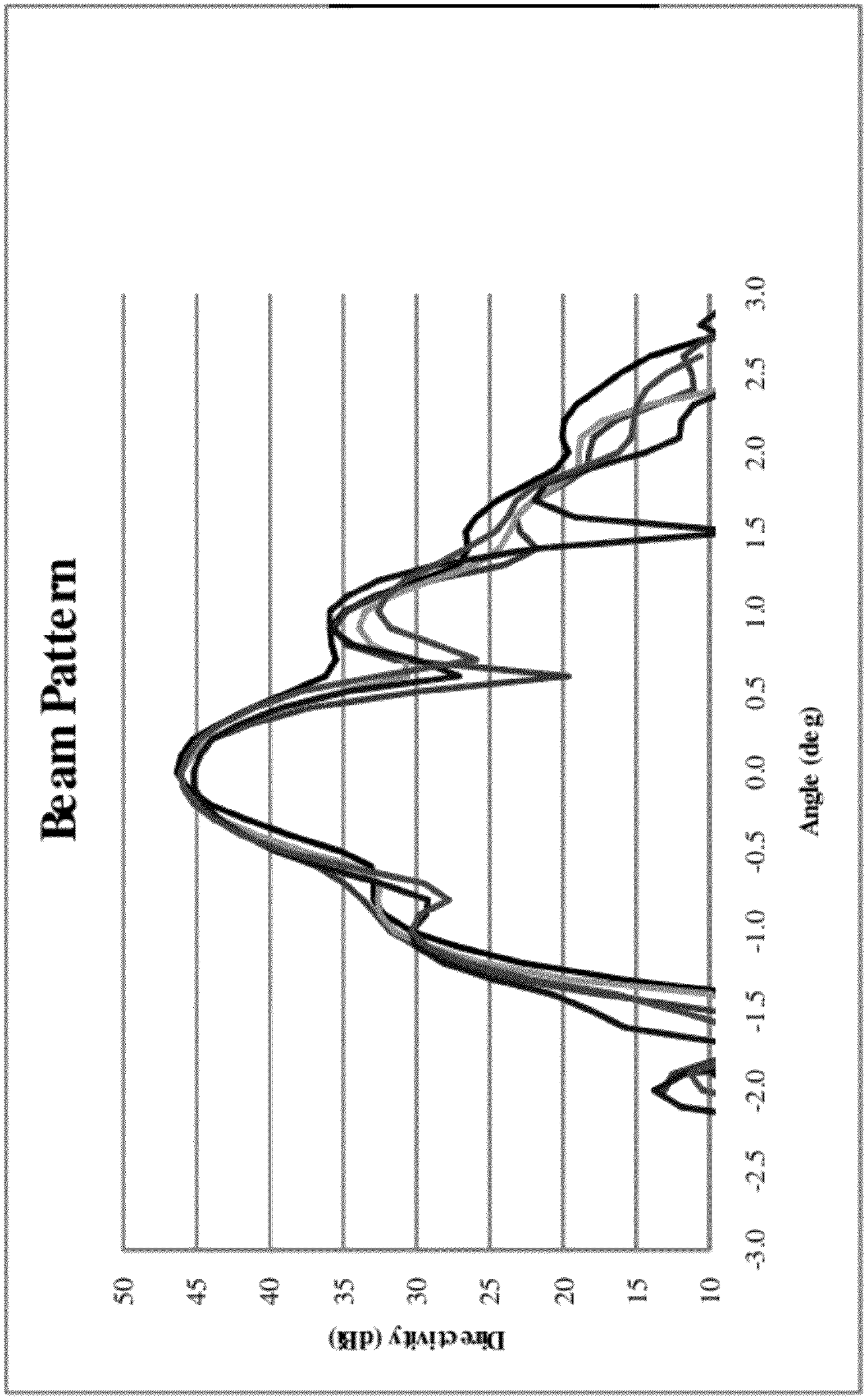
FIG. 11 shows computed far-field patterns of the four beams of FIG. 10 along an azimuth cut at the beam peak locations.

The computed far-field patterns of the four beams of FIG. 10 along the azimuth cut at the beam peak locations are plotted in FIG. 11. All of the four beams exhibit spot beam behavior with low scan loss of about 1.0 dB.

As described above, a reflector surface is created first for contour beams. The feed location for spot beams is then found by defocusing the position until uniform or nearly uniform phase distribution appears across the aperture.

In a particular embodiment, a reflector surface is created for Ku-band North America and Europe coverage (using two dedicated feeds, one for each beam). Then South American spot beam feeds are defocused to positions such that the produced signals have a generally uniform phase distribution across aperture at Ka-band. A spherical cap 308 (FIG. 3) on the South America feeds may be used to minimize the scan loss.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of operating an antenna, the method comprising:

providing a reflector configured to support two or more contour beams created by two or more feed elements, the two or more feed elements being located in a focal plane of the reflector;

providing a spot beam feed element;

illuminating the reflector with the spot beam feed element at a plurality of distances;

measuring a phase angle at an aperture of the reflector of multiple signals created by a spot beam at each distance;

determining a spot beam feed element location selected from the plurality of distances that creates a signal having a phase angle that varies within a limit across the aperture; and locating the spot beam feed element at the spot beam feed element location to generate a spot beam using the reflector configured to support the two or more contour beams.

2. The method of claim 1, further comprising:

locating a spherical cap at the spot beam element location.

3. The method of claim 1, wherein the spot beam feed element provides a signal in a Ka-band, and the one or more feed elements provide signals in a Ku-band.

4. The method of claim 1, wherein locating the spot beam feed element includes affixing the spot beam feed element to a communications deck of a satellite.

5. The method of claim 1, further comprising:

affixing the feed elements to a communications deck of a satellite.

6. The method of claim 1, including spatially isolating at least a portion two or more contour beams in order to provide sufficient copolar isolation among the two or more contour beams so they can re-use identical the first frequency or frequency band.

7. The method of claim 1, further comprising:

configuring multiple spot beams such that they are spatially isolated in order to provide sufficient copolar isolation among them so that they can re-use identical the second frequency or frequency band.

* * * * *